United States Patent

Tonder et al.

[11] Patent Number: 5,961,897
[45] Date of Patent: Oct. 5, 1999

[54] MANUFACTURE OF MAN-MADE VITREOUS FIBER PRODUCTS

[75] Inventors: Flemming Weiss Tonder, Jyderup; Anders Ulf Clausen, Koge, both of Denmark

[73] Assignee: Rockwool International A/S, Denmark

[21] Appl. No.: 09/077,576
[22] PCT Filed: Nov. 29, 1996
[86] PCT No.: PCT/EP96/05301
  § 371 Date: Sep. 8, 1998
  § 102(e) Date: Sep. 8, 1998
[87] PCT Pub. No.: WO97/20781
  PCT Pub. Date: Jun. 12, 1997

[30] Foreign Application Priority Data

Dec. 1, 1995 [GB] United Kingdom ............ 9524608

[51] Int. Cl.$^6$ .......................................... C03B 37/05
[52] U.S. Cl. .................... 264/6; 264/8; 65/443; 65/455
[58] Field of Search ............. 264/8, 6; 65/516, 65/517, 530, 443, 455

[56] References Cited

U.S. PATENT DOCUMENTS

| 2,944,284 | 7/1960 | Tillotson et al. |
| 3,019,127 | 1/1962 | Czerwonka et al. |
| 3,343,933 | 9/1967 | Mullan et al. |
| 3,953,185 | 4/1976 | Aoki et al. ........................ 65/8 |
| 4,433,992 | 2/1984 | Debouzie ......................... 65/3.1 |
| 5,123,949 | 6/1992 | Thiessen ......................... 65/4.4 |
| 5,232,638 | 8/1993 | Thiessen ......................... 264/6 |

FOREIGN PATENT DOCUMENTS

| 0530843A1 | 9/1992 | European Pat. Off. |
| 0565392A1 | 3/1993 | European Pat. Off. |
| 1234075 | 6/1971 | United Kingdom. |
| 91/10626 | 7/1991 | WIPO. |
| WO91/15032 | 10/1991 | WIPO. |

*Primary Examiner*—Mary Lynn Theisen
*Attorney, Agent, or Firm*—Ostrolenk, Faber, Gerb & Soffen, LLP

[57] ABSTRACT

A process is provided for making filled mineral fiber products which comprises applying mineral melt to a rotating fiberizing rotor and thereby throwing from the rotor as fibers and forming a substantially annular cloud of fibers, spraying binder into the annular cloud of fibers, carrying the fibers axially from the rotor towards a collector surface and collecting the fibers on the collector surface as a web. The process includes spraying into the substantially annular cloud a slurry which has specific gravity of at least 1.1, preferably at least 1.2, and which comprises a substantially stable liquid dispersion of particulate material in an aqueous binder.

14 Claims, 2 Drawing Sheets

MANUFACTURE OF MAN-MADE VITREOUS FIBER PRODUCTS

This invention relates to the manufacture of filled man-made vitreous fibre (MMVF) products. These are products which are made by fiberising mineral melt, collecting the fibres into a web or other structure and incorporating additional particulate material into the product.

It is well known to produce MMVF products by applying mineral melt to a rotating fiberising rotor and thereby throwing the melt from the periphery as fibres and forming a substantially annular cloud of the fibres, spraying binder into the annular cloud of fibres, carrying the fibres axially from the rotor towards a collector surface and collecting the fibres on the collector surface as a web. The binder may be sprayed into the cloud from outside the annular cloud or it can be sprayed radially outwards from inside the annular cloud. When there are several adjacent rotors arranged in a cascade spinner, the individual annular clouds merge into a single substantially annular cloud around the cascade. This annular cloud is carried forward towards a collector and loses its annular configuration as it travels away from the rotor or rotors.

It is known to incorporate filler particles in the web and various ways have been proposed for achieving this. One method involves forming the bonded web in conventional manner and applying the particles to the preformed web. For instance the particles may be scattered onto the web while it is being vibrated, as in U.S. Pat. No. 3,019,127, or the bonded web may be impregnated with an aqueous slurry of the particles. Unfortunately, these methods tend to give non-uniform distribution of the particles, especially when the particles are relatively coarse, with the greatest concentration of particles on the outer surface. Impregnation methods have the disadvantage of needing to dry the impregnated product.

It is known to include the filler in the melt, for instance as described in U.S. Pat. No. 3,953,185, but this severely influences fibre formation and is not suitable for introducing significant amounts of a wide variety of particulate materials.

It is known to add particulate material to the cloud of fibres as it travels towards the collector. For instance in GB 1234075 (DE 1759511) a stream of particles entrained in a gas are projected into the cloud and binder is sprayed onto the fibres or onto the particles or both before they reach the collector. In practice it is difficult to achieve by this technique a uniform distribution of filler particles which are bonded into the web. Thus the bonding of the particles is liable to be non-uniform with the result that a significant proportion of the filler is liable to shake out of the web during handling, and the distribution of the filler may be non-uniform. Particular problems arise when it is desired to introduce rather fine particles, for instance below 100 $\mu$m and often below 50 $\mu$m. The particles described in GB 1234075 are particles of sand having a size of 0.1 to 0.4 mm, ground glass, pulverised rock, slag, perlite and vermiculite.

In WO 90/15032 the shaft of the rotating fiberising rotor is hollow to allow the blowing of air or other gases, and binder or other additives. It is said that the hollow shaft can also be used for the supply of solid particles such as clay or cement or edge spill fibres. It is stated that air or another gas can carry particles to the front of the rotor, and thus they will be thrown from the stationary outlet orifices in the shaft towards the fibre cloud that is formed around the rotor. It is difficult to achieve the introduction of significant amounts of additive by this technique without loss of properties such as bonding.

In EP-A-530843 particles entrained in a gas stream are injected into a preformed cloud of fibres or are dropped onto binder that is being thrown radially from the centre of the spinning rotor, outwardly into the annular cloud formed from the rotor. Various particulate additives are proposed including MMVF edge trim or scrap and newsprint fibres. It is stated that the fibres should be finely ground, but the dimensions that are proposed in practice are always above 300 $\mu$m.

This method, like all known methods for introducing filler particles into the fibre cloud, tends to result in an inferior product when the amount of filler is significant. For instance it is common to blow waste MMV fibre, typically having a length more than 1mm, entrained in air into the fibre cloud that is being collected but the performance of the collected web tends to decrease as the amount of recycled fibre increases, because of the adverse effect the added material has on the properties of the product.

In U.S. Pat. No. 3,343,933 a process is described in which a binder is sprayed from a central orifice outwardly into an annular cloud of fibres and it is stated that this method may be used to introduce various materials in slurry form. No details are given about the slurry, the materials or the amounts. The construction of the spray is such that it would probably only be operable with a slurry of relatively low density using very finely divided particulate material, and even then results would probably be uneven and poor if the amount of additive is significant.

The application of a combination of binder and water-proofing composition or other treating material is mentioned in U.S. Pat. No. 2,944,284 and the use of a binder dispersion is described in EP-A-565392.

WO91/10626 describes a method for applying binder to mineral wool. Fibres are produced from the surface of a fiberising rotor. A centrifugal ejector for binder is positioned coaxially with and forward of the rotor. Binder materials are thrown centrifugally from the edge of the centrifugal ejector. The binder is thrown as droplets into the annular cloud of fibres. The binders described are conventional thermosetting binders, for instance as a solution in water. The application does not suggest the inclusion of solid materials in the binder solution. Filled mineral wool products are not specifically described.

U.S. Pat. No. 4,433,992 describes another system which comprises a fiberising rotor and a centrifugal ejector for applying binder. In this system also binder is thrown outwardly from the edge of the ejector as droplets towards the annular cloud of fibres. Inclusion of particulate material in the binder solution is not suggested. Production of filled mineral wool is also not described.

In practice, it is not possible by known methods to introduce a useful amount of many potentially useful particulate additives without causing poor properties in the final product. It would therefore be desirable to be able to introduce significant amounts of a variety of particulate fillers into MMVF products in such a way that they are uniformly distributed and uniformly bonded into the products. In particular it would be desirable to be able to do this in a manner which allows for the possibility of the filler improving rather than detracting from the properties of the MMVF products.

In the invention, we make a filled MMVF product by a process comprising applying mineral melt to a rotating fiberising rotor and thereby throwing the melt from the periphery of the rotor as fibres and forming a substantially annular cloud of the fibres, and spraying into the substantially annular cloud a slurry which has specific gravity at least 1.1 and which comprises a substantially stable liquid dispersion in aqueous binder of a particulate material.

Since the particulate material is introduced as a slurry in an aqueous binder, every particle is potentially coated with aqueous binder. Accordingly this maximises the bonding of the particles into the MMVF product since every particle potentially can be bonded to one or more of the MMV fibres in the MMVF product.

Although it might have been thought that best results (eg good distribution of uniformly bonded filler) would be achieved with a low density slurry of colloidal sized (eg 1 $\mu$m) particles, the invention is based in part on the fact that best results are, in fact, achieved when the filler is coarse and the slurry has a high density.

The particulate material is preferably relatively coarse since it is possible to include a relatively large amount of the filler without increasing the surface area in the MMVF product so significantly as to require a major and unacceptable increase in the amount of binder that is required to achieve satisfactory bonding. For instance the surface area of 1 gram of a 1 $\mu$m filler typically is around 20 times the surface area of 1 gram of a 20 $\mu$m filler. Thus a 20 $\mu$m filler requires very much less binder, for satisfactory binding properties, than a 1 $\mu$m filler. Thus, by using relatively coarse filler, it is possible to maintain good fibre-fibre bonding properties within the MMVF product, and good fibre-filler bonding properties, using an amount of binder which is not unacceptably more than the amount which would be used in the absence of filler. For instance the dry weight of binder is typically in the range 1 to 3% in a conventional MMVF product and in the invention the amount may be increased by up to 50% or 100%, for instance to within the range 2 to 6%.

As a result of having a high density slurry, it is possible to obtain more uniform penetration of the slurry into the cloud of fibres, and thus more uniform distribution in the final product. This is because increasing the specific gravity of the slurry allows for the kinetic energy of the sprayed droplets of the slurry, as they leave the spray, to be increased such that the droplets will penetrate the cloud more thoroughly than if the slurry has lower specific gravity. Thus increasing the specific gravity allows for increased penetration of the slurry into the cloud of fibres and it is easily possible to arrange for the spraying to be conducted under conditions such that the sprayed slurry penetrates substantially uniformly through the cloud of fibres, even when the cloud is relatively dense.

In practice the slurry will normally contain at least 2%, often at least 5%, by weight of the slurry, of coarse particulate filler, and often the amount of this particulate filler is at least 10% and usually above 20%. It can be as much as 60 or even 75, up to 98%. Suitable amounts are 10 to 90% by weight, for instance 40 to 90 or 10 to 50% by weight. Preferably the filler which is present in these amounts has a mean particle size of at least 5 $\mu$m, often at least 10 $\mu$m, more preferably at least 20 $\mu$m, most preferably at least 30 $\mu$m or 40 $\mu$m. It can be up to 50 $\mu$m or greater. Often at least 90% by weight of the coarse filler has a size above 5 $\mu$m, e.g., above 10 or 20 $\mu$m.

The specific gravity of the slurry is preferably at least 1.2, preferably at least 1.3 and often at least 1.4. It is usually below 2, generally below 1.7.

The invention is particularly useful for the distribution of abrasive particulate materials, although softer, less abrasive, materials giving a slurry having the required density can also be used.

In order to facilitate spraying, it is desirable that the slurry should be reasonably stable against settlement and the aqueous binder therefore preferably includes a dispersion stabiliser that will inhibit settling. The dispersion stabiliser may be any suitable viscosifier, but preferably it is a colloidal material since the presence of colloidal material in the aqueous phase can both inhibit settlement of the filler and adjust the rheology of the slurry so as to facilitate spraying. Other viscosifiers may be ions, polyelectrolytes, thickening agents or other rheology adjusting substances. Preferably the dispersion stabiliser is a clay and thus the slurry is preferably a slurry of coarse particulate filler having a size of above 5 $\mu$m, more preferably above 10 $\mu$m, in an aqueous dispersion of clay particles, typically having a size below 5 $\mu$m, often below 3 $\mu$m, eg 0.1 to 2 $\mu$m.

Suitable types of clay which can be used for this purpose include bentonite, fuller's earth, kaolin, ball clay, fire clay, halloysite and refractory clay, suitable particle sizes are 4 $\mu$m or below, often 2 $\mu$m or below.

The amount of clay or other colloidal material in the slurry is typically in the range 0.5 to 7%, based on the weight of slurry, generally in the range 1.5 to 5%.

Some of the clays, for instance bentonites and certain kaolins can tend to have a binding effect within the MMVF product and the clay particles may serve not only as dispersion stabiliser but also as part or all of the binder. The aqueous phase may contain suitable organic materials such as oils and surfactants. Preferably however, the aqueous phase contains a solution of organic resin, for instance any of the conventional resins which are used for bonding MMVF products.

The slurry can be sprayed into the annular cloud at any convenient position either from outside the annular cloud or from within it. The annular cloud can be the cloud formed in front of and close to a cascade spinner or the cloud in front of and around an individual rotor. The spraying should be at a position before the location at which the cloud has become a more uniform, non-annular cloud on its travel towards the collector. In some processes the cloud is still substantially annular when it reaches the collector.

The slurry may be sprayed from an annular spray ring which surrounds the cloud or from individual spray elements. Naturally the sprays must be designed so as to break the slurry up into spray droplets of an adequately small size and high kinetic energy to penetrate adequately the annular cloud.

Preferably the slurry is sprayed substantially radially outwards from a position within the annular cloud. The spraying of the slurry may be substantially coaxial with the annular cloud. It is desirable that the sprayed droplets of slurry should be thrown with optimum kinetic energy from spray positions which are reasonably close to the inner surface of the annular cloud. Preferably therefore the radial distance between the axis of the rotor and the position of the or each spray is at least 50%, and preferably at least 60%, of the radial distance from the axis to the periphery of the rotor.

The spraying can be conducted from stationary spray orifices, for instance arranged around a circle coaxial with the axis of the rotor, in which event the slurry should be supplied to the orifices with sufficient force to achieve adequate atomisation and kinetic energy for the sprayed slurry droplets. It is, however, convenient to form the spray droplets by centrifugal force as a result of having fluid distribution means mounted for rotation coaxially with the rotor, wherein the fluid distribution means are mounted for rotation substantially coaxial with the rotor. Thus the slurry may be fed to the fluid distribution means and thrown centrifugally from their outermost radial edge as the fluid distribution means rotate with the rotor. Apparatus of this general type is shown in U.S. Pat. No. 2,944,284 and U.S. Pat. No. 4,433,992.

The apparatus preferably includes a fluid flow duct which is substantially non-rotatable and which extends through the shaft on which the rotor is mounted, since this avoids centrifugation of the slurry until it is about to emerge from the distribution means. Such a system is described in U.S. Pat. No. 2,944,284.

Preferably the non-rotatable shaft leads to a fluid flow outlet which discharges the slurry onto a distribution surface of the fluid distribution means whereby the slurry is accelerated centrifugally to the edge of the fluid distribution means and then thrown off the edge as a spray. The distribution surface may be within a closed space as exemplified in U.S. Pat. No. 2,944,284 and U.S. Pat. No. 4,433,992 but it is preferably an open surface which is substantially frustoconical. Thus the fluid can be discharged onto the inner part of the frustoconical surface and accelerated by rotation towards the outer part, off which it is thrown as a spray.

Suitable apparatus for spraying the slurry radially outwards into the annular cloud of fibres is described in our International Publication WO97/20779.

The rotor can be a spinning cup type of rotor for instance as described in EP 530843 or a Downey type of rotor as described in U.S. Pat. No. 2,944,284 and U.S. Pat. No. 3,343,933. Preferably, however, the rotor is mounted about a substantially horizontal axis and has a solid periphery and is constructed to receive melt applied onto the periphery and to throw mineral fibres off the periphery. Most preferably it is a cascade spinner containing two, three or four such rotors, each of which may be as described above. A suitable cascade spinner is described in, for instance, WO 92/06047. The slurry may be sprayed coaxially from all of the fiberising rotors but often it is sufficient to spray only from one or perhaps two of the fiberising rotors. For instance the slurry may be sprayed coaxially from the last, and preferably also the penultimate, fiberising rotor and, if desired, binder may be sprayed coaxially from the other fiberising rotors. Accordingly, the annular cloud of fibres into which the slurry is sprayed will not be a true annulus but will instead merely extend forward from the outermost parts of the cascade of rotors. However the kinetic energy is such that in the regions around the rotor where there is less fibre formation (relatively close to the adjacent rotors) the slurry particles tend to be thrown sufficiently far towards the other rotors and beyond the other rotors that they will enter the annular cloud around one or more of the other rotors.

When the slurry is sprayed coaxially from one or more fiberising rotors, it may be sprayed uniformly, such that substantially equal amounts of slurry are sprayed in all directions. Alternatively it may be sprayed non-uniformly, such that larger amounts of slurry are sprayed in some directions than in others. For instance, in some systems it is preferred to spray the slurry so that substantially all of the slurry is sprayed over a relatively narrow segment of the circular rotor. In particular, we find that where the fiberising rotor is mounted on a horizontal axis of rotation, it is desirable to spray the slurry substantially upwardly, so that substantially no slurry is sprayed in a direction below the horizontal. Preferably the sprayed slurry is kept within an angle of not more than 175°, preferably not more than 150°, for instance around 135°.

This non-uniform, preferably substantially upward, spraying may be achieved in any suitable manner. For instance spraying may be through nozzles which point upwardly only. If a fluid distribution means is used the slurry can be fed to the fluid distribution means so that it is thrown from the distribution means from one region only of the outermost radial edge, in particular upwardly.

The web which is produced in the invention may be used as such, often after compression and heating to cure it. Often, however, the uncured web is laid upon itself to form a thicker batt, which is then impressed and cured in conventional manner. The batt can be in the form of a flat slab or it can be of any desired shape, for instance a pipe section. If desired, the web can be comminuted to form a tufted or granulated product which can be used as a pourable insulation material.

The MMVF materials produced by the process according to the invention may be used for any purpose known for MMVF products, eg fire insulation and protection, thermal insulation, noise reduction and regulation, construction, horticultural media, reinforcement of other products such as plastics and as a filler. The materials may be in the formed of bonded batts (which may be flat or curved) or the materials may be comminuted into the granulate.

Typical coarse particulate materials which can be introduced into the MMVF product include waste mineral wool fibres, clay, perlite, vermiculite, pigments, aluminium hydrate, magnesium hydroxide. Fire protective materials as described in our International Publication Number WO97/20780 may be made. When the coarse filler is fibrous, the sizes which are quoted refer to the length of the filler.

The invention will now be illustrated with reference to the accompanying drawing which show an apparatus which is used in the subsequent example.

Figure 1:
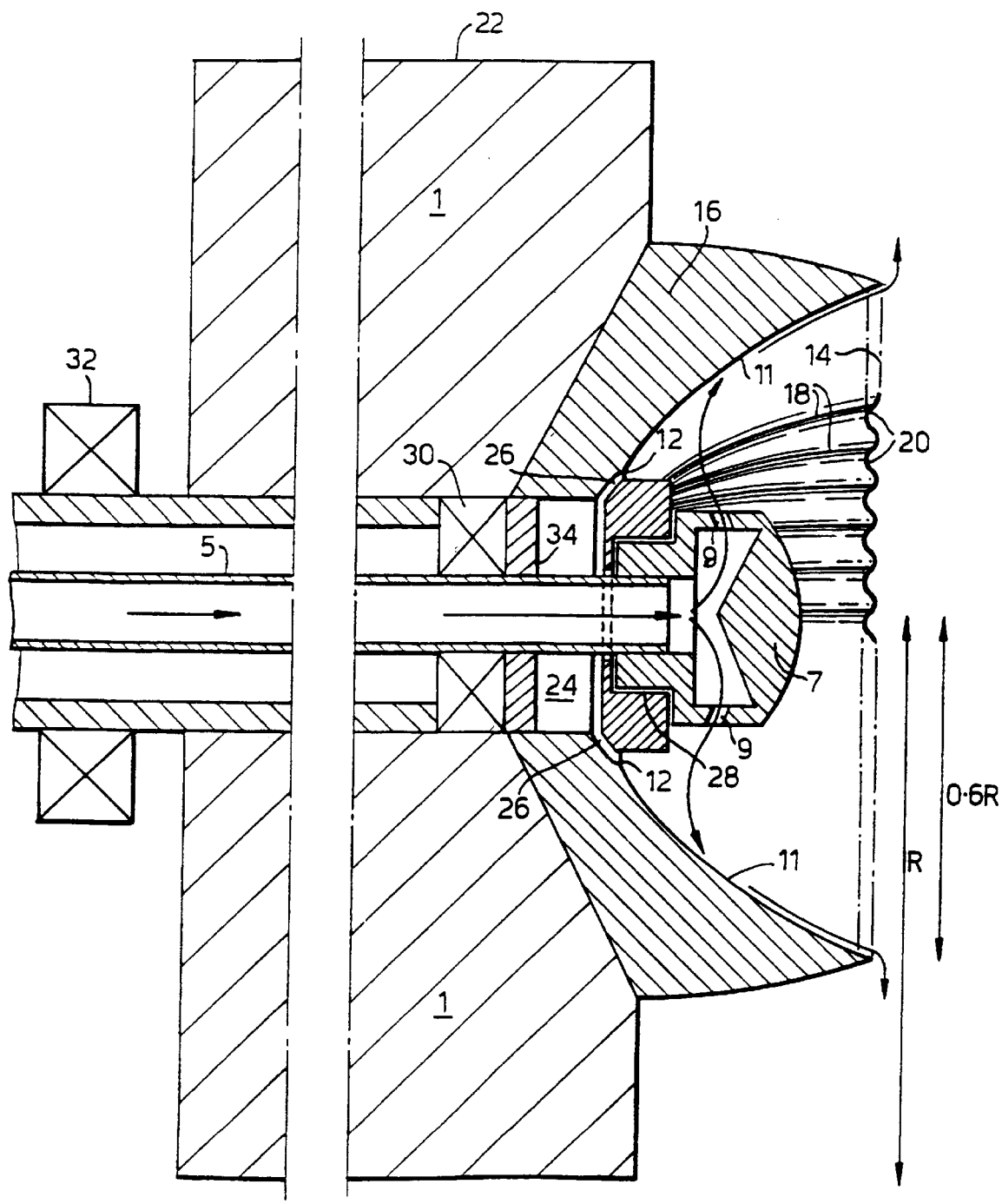
FIG. 1 shows a cross-section through a rotor which forms part of the spinner.

FIG. 1 shows a solid rotor 1 of the type used in a cascade spinner mounted on a rotatable shaft 3. Fixed to the rotor is a liquid distribution means 16 having a distribution surface 11. The substantially frustoconical surface 11 is a concave surface containing a plurality of grooves 18, of which six are illustrated. The distribution surface has a short edge 12 and a long edge 14, the long edge 14 being forward of the short edge 12. The long edge 14 is at a radius 0.6 R, where R is the radius of the rotor. The rotor 1 is supported, on the rotating shaft 3, by roller bearings 32. The non-rotatable liquid flow duct 5 is supported on bearings 30, usually roller bearings, between the rotating shaft 3 and the non-rotatable liquid flow duct 5. The non-rotatable liquid flow duct 5 leads into and is fixed to the liquid flow outlet 7, which is also non-rotatable. This has two (or more) radially extending discharge orifices. The radially extending discharge orifices may be inclined rearwardly at an angle of 10–45° so as to ensure discharged liquid meets the distribution surface at the smallest possible radius.

In use a suspension of particulate solids in an aqueous phase is supplied (supply means not shown) to the liquid flow duct 5 which extends through the rotatable shaft 3, and into the liquid flow outlet 7. The suspension then passes through the orifices 9.

The partially atomised suspension passes across an air gap in the direction of the arrows and onto the distribution surface 11. The rapid spinning of the liquid distribution means 16 induces radial outward movement of the suspension, guided by the grooves 18, to the end points 20 of the grooves at the edge 14. From these end points the suspension is flung in atomised form from the distribution surface radially outwards and forward of the rotor.

If any suspension fails to travel radially outwards along the grooves 18, but tends to leak back into the apparatus, it passes along the inlet channel 28 into the rotating annular chamber 24. Rotation of the chamber induces the suspension to move to the outer wall of the chamber, from where it flows along outlet channel 26 onto the distribution surface at its short edge. A seal 34 is positioned between the chamber 24 and the roller bearings 30. Leakage into other regions of the apparatus is thus avoided.

Concurrently, melt is applied to the periphery 22 of the rotor 1 which is spinning rapidly and flinging the melt from the periphery as fibres. The fibres are blown forward by conventional air supply means (not shown) in an annular cloud. As the fibres are blown forward they are met by the atomised suspension from the liquid distribution means. The suspension and additives it contains penetrate the annular cloud and coat the fibres.

The fibres are then collected as a web containing uniformly distributed additive on a collector in conventional manner. The web may be subjected to cross-lapping to form a batt, and the product may be compressed and heat cured in conventional manner.

Figure 2:
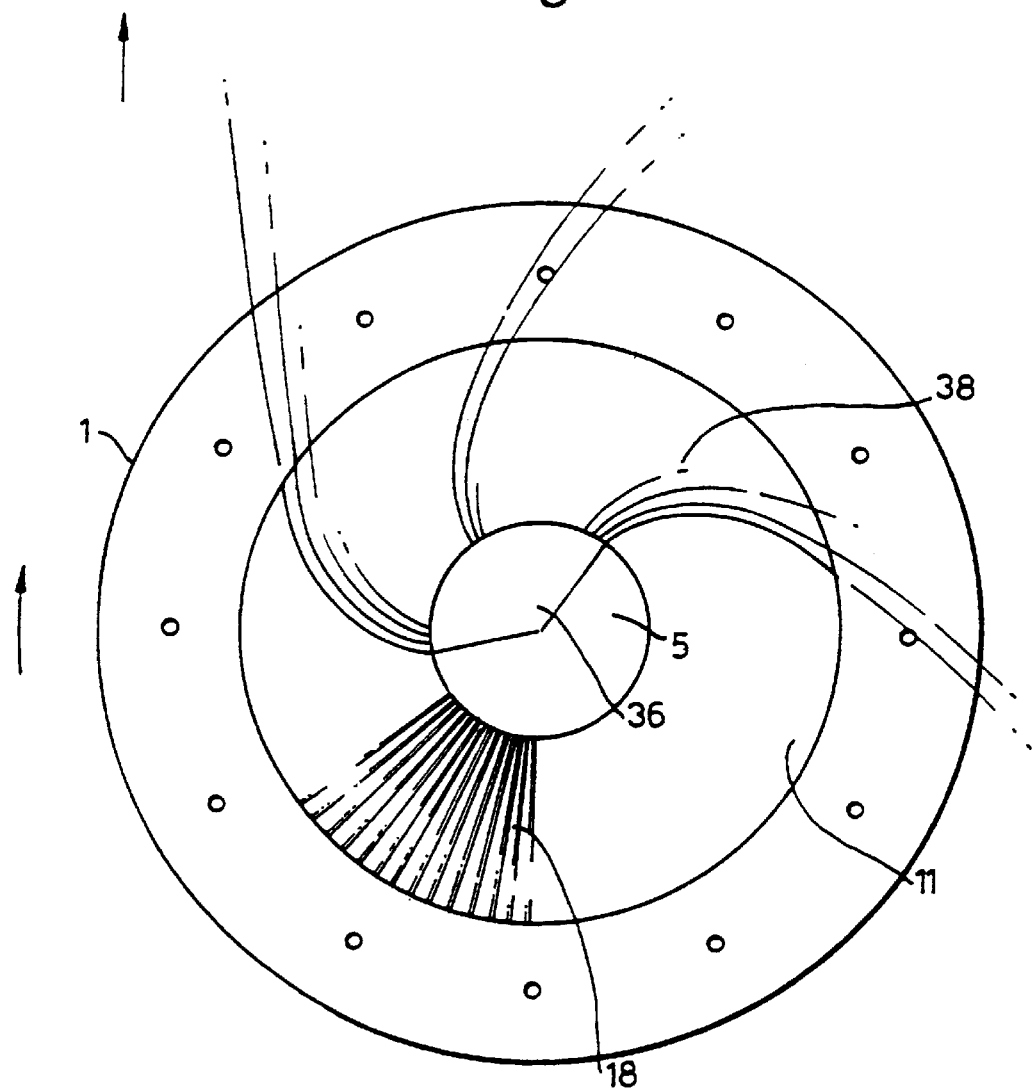
FIG. 2 shows a front view of a further rotor according to the invention showing an alternative liquid flow outlet.

FIG. 2 shows an alternative construction for the liquid flow outlet 7. In this construction it is in the form of a slot covering around 135° of the possible 360°. Liquid additive exits the liquid flow duct 5 through the slot 36 and is passed to the liquid distribution surface 11. The liquid additive flows over the region 38. The "spiral" type path of the liquid arises as a result of the rapid rotation of the distribution surface in a clockwise direction. In other embodiments the surface may rotate in an anticlockwise direction. The liquid additive is thus flung from the long edge 14 of the distribution surface in a substantially upward direction over around 135° of the circumference of the distribution surface.

The following is an example of the invention.

EXAMPLE 1

A suspension of resol formaldehyde binder in water is placed in a pulper. A slurry having specific gravity above 1.1 is produced by mixing with the binder dispersion particulate magnesium hydroxide having a mean size of 35 μm. The slurry is included in fibres at the point of fibre formation by means of the apparatus and process of FIG. 1 described above. A slab product is produced from the resulting fibres.

The same process is carried out without the use of magnesium hydroxide fire retardant material.

Both the fire resistant slab according to the invention (slab A) and the conventional slab (slab B) were subjected to a standard fire test according to ISO 834. Results are shown in Table 1 below. These illustrate the temperature on the cold side of the slab after a certain time.

The results shown indicate the gradual increase in temperature on the cold side of the slab as a result of heat passing through the slab. In some products a very rapid increase in temperature followed by a very rapid decrease in temperature can be observed. This is due to combustion of binder. This combustion is minimised in slab A of the invention.

As can be seen from the results below the time for the temperature on the cold side of the slab to rise to 190° C. or greater is more than three times as long with slab A than with slab B, showing the improved fire and heat resistance of the products made by the process.

TABLE 1

| Time (min) | 0 | 10 | 20 | 30 | 40 | 50 | 60 | 70 | 80 | 90 | 100 |
|---|---|---|---|---|---|---|---|---|---|---|---|
| Temperature (° C.) Slab A | 18 | 23 | 42 | 47 | 69 | 123 | 150 | 152 | 154 | 158 | 161 |
| Temperature (° C.) Slab B | 18 | 27 | 46 | 290 | — | — | — | — | — | — | — |

We claim:

1. A process for making filled MMVF product comprising applying mineral melt to a rotating fiberising rotor (1) and thereby throwing the melt from the rotor (1) as fibres and forming a substantially annular cloud of the fibres, spraying binder into the annular cloud of fibres, carrying the fibres axially from the rotor (1) towards a collector surface and collecting the fibres on the collector surface as a web, characterised in that the process includes spraying into the substantially annular cloud a slurry which has specific gravity at least 1.1 and which comprises a substantially stable liquid dispersion of a particulate material in an aqueous binder.

2. A process according to claim 1 in which the slurry contains at least 5% by weight of coarse filler having an average particle size of at least 5 μm.

3. A process according to claim 1 in which the aqueous binder comprises colloidal dispersion of clay having a size in the dispersion below 5 μm.

4. A process according to claim 1 in which the aqueous binder comprises an aqueous solution of organic material selected from the group consisting of organic resins, oils and surfactants.

5. A process according to claim 1 in which the slurry has a specific gravity of from 1.2 to 1.7.

6. A process according to claim 1 in which the slurry has a filler content of 2 to 98%.

7. A process according to claim 1 in which the slurry is sprayed radially outwardly into the annular cloud from a position coaxial with the axis of the rotor (1).

8. A process according to claim 1 in which the slurry is sprayed into the annular cloud radially outwardly and coaxially with the axis of the rotor (1) and substantially upwardly such that it spreads over an angle of not more than 150°.

9. A process according to claim 1 in which the slurry is sprayed radially outwardly into the annular cloud from distributor means (16) which rotate with the rotor and which have a radius at least 50% of the radius of the rotor.

10. A process according to claim 9 in which the mineral melt is fiberised using a cascade spinner of at least 3 fiberising rotors (1) and the slurry is sprayed outwardly from the distributor means (16) which rotate with one only of the fiberising rotors (1).

11. A process according to claim 9 in which the mineral melt is fiberised using a cascade spinner of at least 3 fiberising rotors (1) and the slurry is sprayed outwardly from the distributor means (16) which rotate with at least two of the fiberising rotors (1).

12. A process according to claim 9 in which the slurry contains at least 5% by weight of coarse filler material having an average particle size of at least 5 µm, a specific gravity from 1.2 to 1.7 and a filler content of 2 to 98%.

13. A process according to claim 12 in which the slurry has a filler content of 10 to 60%.

14. A process according to claim 1 in which the slurry has a filler content of 10 to 60%.

* * * * *